United States Patent [19]
Fujimura et al.

[11] Patent Number: 5,744,037
[45] Date of Patent: Apr. 28, 1998

[54] METHOD OF TREATING FOUL WATER

[75] Inventors: Hiroyuki Fujimura, Tokyo; Takayuki Suzuki, Kanagawa-ken; Norio Yamada; Yoshiyuki Ichiki, both of Tokyo, all of Japan

[73] Assignee: Ebara Corporation, Tokyo, Japan

[21] Appl. No.: 758,249

[22] Filed: Nov. 27, 1996

[30] Foreign Application Priority Data

Nov. 28, 1995 [JP] Japan ................................. 7-331189
Dec. 25, 1995 [JP] Japan ................................. 7-350053

[51] Int. Cl.$^6$ ............................ B01D 37/00; C02F 11/06
[52] U.S. Cl. ...................... 210/620; 210/630; 210/903; 210/769; 110/245; 110/346
[58] Field of Search ....................... 210/768, 769, 210/609, 605, 612, 613, 903, 620, 630; 110/235, 243, 244, 245, 346

[56] References Cited

FOREIGN PATENT DOCUMENTS 0676464  10/1995  European Pat. Off. .

7-332614  12/1995  Japan .

Primary Examiner—Robert Popovics
Attorney, Agent, or Firm—Browdy and Neimark

[57] ABSTRACT

In an improved method of treating foul water, the solids that are produced during the process of treatment of foul water such as wastewater or liquid sludges are treated with a heat treatment apparatus and the resulting thermal energy and/or gas is utilized in the treatment of said foul water. The foul water may be subjected, directly and/or after a treatment, to a filtration step using a filter packed with nonflammable particulate matter such as sand, and the trapped solids are fed into a fluidized-bed heat treatment apparatus such as a fluidized-bed incinerator or gasification furnace and, thereafter, the nonflammable particulate matter in the heat treatment apparatus is returned to the filtration step. The foul water can be treated with effective utilization of the energy of the organic matter in the foul water or the solids that are produced during the process of its treatment.

14 Claims, 5 Drawing Sheets

METHOD OF TREATING FOUL WATER

BACKGROUND OF THE INVENTION

This invention relates to a method of treating various types of foul water such as night soil, septic sludge and sewage.

Treatment of foul water is a critical element of the environmental preservation technology and huge investment and operating costs are expended to perform this treatment. During the treatment of foul water, solids such as sludge occur and there is reported a case in which sewage sludge is digested anaerobically and the evolving methane gas is recovered for subsequent use in generating electricity. A problem with this method is that anaerobic digestion can achieve only about 50% degradation of the sludge and that it takes as many as 15–30 days for methane gas to evolve.

Table 1 lists various properties of collected night soil and septic sludge which are two typical examples of foul water. Obviously, they contain high levels of BOD and suspended solids (hereunder referred to simply as "solids"). In the treatment of night soil, the sand and gravel contents are removed in a grit chamber and coarse foreign materials are separated by screens or other suitable means, followed by a biological treatment and flocculation. The separated foreign materials, the excess sludge produced in the biological treatment and the flocculated sludge produced by flocculation are dewatered and incinerated either immediately or after drying.

TABLE 1

Properties of Collected Night Soil and Septic Sludge

| | Class | | | | | |
|---|---|---|---|---|---|---|
| | Collected night soil Non-excess probability | | | Collected septic sludge Non-excess probability | | |
| Items | 50% | 75% | 84% | 50% | 75% | 84% |
| pH | 8.0 | 8.4 | 8.6 | 7.0 | 7.4 | 7.4 |
| BOD (mg/L) | 11,000 | 13,000 | 14,000 | 3,500 | 5,500 | 6,800 |
| COD (mg/L) | 6,500 | 7,900 | 8,600 | 3,000 | 4,500 | 5,600 |
| Suspended solids* (mg/L) | 14,000 | 18,000 | 20,000 | 7,800 | 13,000 | 16,000 |
| Evaporation residues (mg/L) | 27,000 | 32,000 | 35,600 | 10,000 | 16,000 | 19,000 |
| Total nitrogen (mg/L) | 4,200 | 4,900 | 5,200 | 700 | 1,100 | 1,400 |
| Total phosphorus (mg/L) | 480 | 610 | 680 | 110 | 190 | 250 |
| Chloride ion (mg/L) | 3,200 | 3,800 | 4,200 | 200 | 360 | 540 |

*Data on samples of 2-mm mesh pass.

In the treatment of sewage, sand and gravel are removed in a grit chamber and solids having comparatively good settling characteristics are separated by gravity in a primary settling basin, then a biological treatment is conducted. The sludge in the primary settling basin and the excess sludge produced by the biological treatment are subjected to various ensuing treatments including thickening, anaerobic digestion, dewatering and drying, followed by incineration.

Thus, the treatment of solids in foul water and those such as sludge which are produced in the process of foul water treatment is very important from a process including grit removal and it is no exaggeration that the treatment of foul water is equivalent to that of solids (sludge).

The separated foreign materials, excess sludge, flocculated sludge and the sludge in a primary settling basin are currently dewatered and dried by mechanical means but mechanical dewatering apparatus and dryers have the disadvantage of high construction and operating costs.

One of the inexpensive methods heretofore employed to treat sludges is sun drying, in which the sludge is dewatered and dried on a sand layer. In order to ensure that the sand will not enter the solids in the dried sludge, care must be taken that the scraper will not reach deepen enough to the bottom of the sludge and thereby touch the underlying sand layer. If the scraping of the dried sludge is thorough enough to involve sand entrainment, the sand in the drying bed must be replenished with a new supply of sand and, what is more, an increased amount of the sludge will be left unburnt in the incineration process.

The grit removed by settling in the grit chamber is in a mixed state with other types of solids in night soil-containing foul water (i.e., night soil and/or septic sludge) or sewage and hence need be washed. However, the washing process is rather complicated, requiring cumbersome and dirty operations. In addition, the removed grit is not reduced in volume upon incineration and must be disposed of by landfilling; however, the diminishing capacity of landfill sites is a growing social concern in various regions of Japan.

We now describe the relationship between anaerobic digestion and nitrogen treatment technologies which are the core to the treatments of sludge and foul water.

The key technology in the treatment of organic foul water such as night soil-containing foul water is biological treatments which are roughly divided into a category of aerobic treatments including a nitrification-denitrification process and a class of anaerobic digestion procedures.

In anaerobic digestion procedures, the organic matter in foul water is acted upon by anaerobic microorganisms and decomposed primarily into methane and carbon dioxide and this method has extensively been employed since the treatment cost is smaller than in the case of aerobic treatments.

The removal of nitrogen from night soil-containing foul water is desired for the purpose of preventing the eutrophication of closed bodies of water; since the application of a method of nitrogen removal to anaerobic digestion procedures results in prohibitive treatment costs, existing facilities for nitrogen removal all adopt aerobic treatment methods which require only low cost in nitrogen treatment. All facilities for the treatment of night soil-containing foul water that are to be constructed newly or revamped must have a capability for nitrogen removal, so there will be no new plants that will be constructed adopting the anaerobic digestion method.

On the other hand, the growing consciousness for the use of less energy and resources has brought about renewed interest in the anaerobic digestion procedures which require smaller energy for the treatment. In the anaerobic digestion procedures, organic materials of comparatively high molecular weights are decomposed to organic acids of lower molecular weights or the like under the action of acid producing bacteria and such low-molecular weight species in turn are converted to methane (gasified) with methanogenetic bacteria, with the methane gas being then evaporated from within the water. The biggest problem with the anaerobic digestion procedures is that the greater part of the solids in domestic foul water is composed of cellulosic organic matter and cells which are difficult to biodegrade and that therefore the percent decomposition of such solids is too low to accomplish transformation to gases that can easily be utilized as sources of energy.

As Table 1 shows, night soil-containing foul water contains high levels of nitrogen. The nitrogen in wastewater is a cause of eutrophication ("red tide" or "blue tide") which presents considerable damage in closed bodies of water, so it is required to remove nitrogen from wastewater in such geographic regions and facilities of wastewater treatment having a capability of nitrogen removal have been constructed at several locations.

The biological nitrification-denitrification process is commonly adopted in Japan as a method of nitrogen removal. Another effective method of nitrogen removal is ammonia stripping; compared to the biological nitrification-denitrification process, ammonia stripping has the advantage that it requires a simple apparatus and yet is capable of separating ammonia from water within an extremely short period of time. Notwithstanding these advantages, the ammonia stripping method is seldom used in practice for the following reasons: in the biological nitrification-denitrification process, ammonia is eventually decomposed to innocuous nitrogen and water but in the ammonia stripping method, the ammonia evaporating from within the water must subsequently be decomposed and, in addition, quite high costs are required to maintain the water at a temperature suitable for stripping ammonia (the closer to 100° C. the water temperature is, the greater the ease in stripping). Even the biological nitrification-denitrification process which is currently more economical than the ammonia stripping method is by no means free from problems; methanol which is an industrial chemical that must be purchased from the market are necessary in large amounts; and excess sludge that is fairly difficult to treat is produced in larger amounts than in the anaerobic digestion procedures.

Human night soil and cattle or poultry feces contain high levels of organic matter and nitrogen. From an energy viewpoint, it is more economical to treat these liquid wastes by the anaerobic digestion system than the aerobic approach (such as an activated-sludge treatment method). However, in the anaerobic digestion method, most of the organic matter (BOD source) that is necessary for denitrification is converted to methane gas, so it is not economically feasible to perform the biological nitrification-denitrification process on the supernatant liquor (the digested liquor containing no solids) although detailed reasons are not mentioned here. In view of its nature, the supernatant liquor is best denitrified by ammonia stripping but this method is seldom used commercially for the economic reasons already set forth above.

In the following description, the term "foul water" shall mean various types of foul water such as night soil and sewage and sludges that have sufficiently high water content to be in the fluid state.

There are many prior art references on the fluidized-bed heat treatment equipment and the following may be mentioned as most representative cases:

(1) T. Oshita, DEVELOPMENT AND APPLICATIONS OF FLUIDIZED-BED COMBUSTION TECHNOLOGY FOR WASTE MATERIALS, International Journal of Environmentally Conscious Design & Manufacturing, Vol. 4, No. 1, 1995;

This reference describes various aspects of fluidized-bed incinerators, which include i) an outline of the fluidized-bed incinerator (its construction and operating mechanism), ii) improvements of combustion apparatus and advances in the combustion technology, with particular reference made to the sterile disposal plant (SDP) revolving flow-type fluidized-bed combustion furnace and the TIF non-crush type revolving flow-type fluidized-bed combustion furnace, and iii) application technologies;

(2) U.S. Ser. No. 08/401,370.

The specification of this United States patent application describes various aspects of a method and apparatus for fluidized-bed gasification and melt combustion, which include i) the description of the prior art and its problems, ii) specific operating conditions of the gasification apparatus, melt combustion apparatus and the overall system using these apparatus, iii) specifications of the gasification apparatus, and iv) drawings illustrating the gasification apparatus, melt combustion apparatus and the overall system.

(3) Metcalf & Eddy, Inc., WASTEWATER ENGINEERING: Treatment, Disposal and Reuse, Second Edition, pp. 1–920, McGraw-Hill, Inc. 1979.

This book describes various aspects of physical, chemical and biological treatments of wastewater including process design considerations, methods of treatment, sludge treatment methods and advanced treatments.

SUMMARY OF THE INVENTION

The present invention has been accomplished under these circumstances and has as an object providing a method by which the energy of the organic matter in foul water or the solids that are produced during the process of foul water treatment can be utilized effectively for the purpose of foul water treatment.

This object can be attained by a method in which the solids that are produced during the process of treatment of foul water such as wastewater or liquor sludges are treated with a heat treatment apparatus and the resulting thermal energy and/or gas is utilized in the treatment of said foul water. In a preferred embodiment, the foul water is subjected, directly and/or after a treatment, to a filtration step using a filter packed with nonflammable particulate matter such as sand, and the trapped solids are fed into a fluidized-bed heat treatment apparatus such as a fluidized-bed incinerator or gasification furnace and, thereafter, the nonflammable particulate matter in the heat treatment apparatus is returned to the filtration step.

DESCRIPTION OF THE PREFERRED EMBODIMENTS

The preferred embodiments of the invention method will now be described below with reference to FIGS. 1–4 which illustrate four different cases of applying the method to the treatment of night soil-containing foul water (i.e., a liquid mixture of night soil and septic sludge).

Embodiment 1

Figure 1:
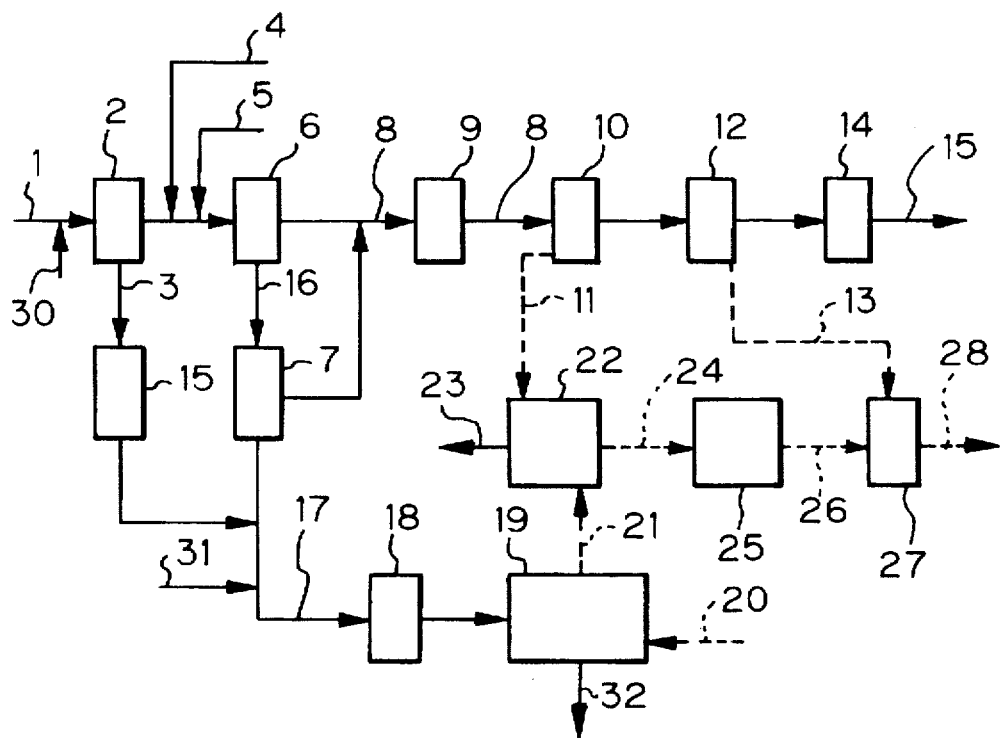
FIG. 1 is a flowsheet for foul water treatment in one embodiment of the invention.

Referring to FIG. 1, a stream of night soil-containing foul water 1 is fed into a preliminary treatment step 2 (using typically a screen) and freed of foreign materials 3 (coarse solids such as scrap paper and PVC). The liquid passing through the screen 2 is mixed with an inorganic precipitant 4 such as ferric chloride for phosphorus removal and with a polymer (organic high-molecular weight precipitant) 5 for removing fine solids. After chemical precipitation with these substances, the effluent is fed into a thickening step 6 and the thickened sludge 16 is transferred to a dewatering apparatus 7 such as a belt press, a filter press or a centrifugal dewatering apparatus. The amount of addition of the inorganic precipitant 4 varies with the concentration of the night soil-containing foul water 1 and if ferric chloride is to be used as the inorganic precipitant, its concentration ranges typically from about 1,500 to about 7,000 ppm. In actual practice, the required additions of the inorganic precipitant and polymer may preferably be determined by conducting an onsite precipitation test with the additives to be employed. In addition to ferric chloride, slaked lime, and aluminum-based precipitant such as alum are also effective as inorganic precipitants. Effective polymers are cationics and nonionics. If there is no need to remove phosphorus from the night soil-containing foul water 1, the injection of inorganic precipitant 4 may be omitted. If polymer 5 is added to the night soil-containing foul water 1 such that even fine solids are removed, one can attain the advantage of increasing the supply of solids into a gasification furnace 19 to thereby produce more gas while avoiding any troubles that would otherwise take place during the treatment of night soil-containing foul water 1.

The separated water 8 leaving the thickening step 6 is retained in a reservoir 9 temporarily before it is introduced into an anaerobic digestion step 10, in which easily degradable soluble organic materials are primarily decomposed into biogases 11 such as methane and carbon dioxide which are transferred to a melting furnace 22. The effluent from the digester 10 is fed into an ammonia separation step 12, in which ammonia 13 is separated from the liquid by ammonia stripping. For treating the residual organic matter, nitrogen and the like, the ammonia-stripped effluent is sent to a post-treatment step 14, where it is subjected to known techniques of treatment such as activated-sludge treatment, biological nitrification-denitrification, flocculation, ozone treatment, membrane treatment and activated-carbon treatment which may be performed either singly or in combination depending upon the required degree of necessity. The treated water 15 is discharged into a water course.

The foreign materials 3 rejected in the preliminary treatment step 2 are dewatered with a suitable machine 15 such as a screw-press dewatering apparatus and the flocculated sludge 16 from the thickening step 6 is dewatered with the machine 7 such as a belt-press dewatering apparatus. The combined dewatered cake 17 passes through a hopper 18 to enter a gasification furnace 19. If sludge such as a flocculated sludge occurs in the post-treatment step 14, it may be fed back to the thickening step 6 in a return path (not shown) for providing ease in subsequent treatments. The dewatered cake may optionally be dried before it is fed to the gasification furnace 19.

In the gasification furnace 19, either one of the following two methods may be employed to produce a gas. The feed to the gasification furnace is controlled to provide an air ratio of 0.1–0.25.

(1) Gasification

This method involves heating at a temperature of 700°–1,100° C. in the gasification furnace, permitting the production of gases of low calorific value (1,000–1,500 kcal/Nm$^3$) or medium calorie (2,500–4,500 kcal/Nm$^3$). At least one gasifying agent 20 selected from among air, oxygen, water vapor and the like is injected from the bottom of the furnace.

(2) Gasification Combined With Combustion

This method involves gas production at a temperature of 400°–850° C. in the gasification furnace, permitting the production of gases of similar calorific values to the gases produced by the first method, provided that fairly high tar and carbide levels result from the use of lower temperatures. As in the first method, at least one gasifying agent 20 selected from among air, oxygen, water vapor and the like is injected from the bottom of the furnace.

In the second method, a gaseous mixture 21 containing the hydrogen, carbon monoxide, water vapor, tar, carbides and other substances that have been produced in the gasification furnace 19 is fed into the melting furnace 22, where it is rapidly oxidized at a temperature as high as about 1,350° C. with supplied oxygen (air) and with the ash in the gaseous mixture 21 being melted under the high temperature and discharged as slag 23. The tar content which is deleterious to the utilization of the product gas is also burnt away. The biogases 11, together with the gaseous mixture 21, may be used as a source of energy to the melting furnace 22. The thermal energy in the hot emission gas 24 is recovered as steam by a waste heat boiler in an energy recovery step 25 and, in addition, various types of energy recovery equipment such as a gas engine, a diesel engine and a gas turbine may be employed either singly or in combination. The emission gas 26 from the energy recovery step 25 is sent to a gas treatment step 27, where gas treatment apparatus such as an electric precipitator, a bag filter, a scrubber, a desulfurizing denitrifying apparatus may be employed either singly or in appropriate combinations depending on the properties of the gases to be treated and the permissible emission levels. If a treatment technology requiring ammonia such as catalytic or noncatalytic denitrification or desulfurization and denitrification using electron beams is to be practiced in the gas treatment step 27, it is economical to utilize the ammonia 13 from the ammonia stripping step 12. If there remains more ammonia 13 to be available even after it is used in desulfurization and denitrification, it may be absorbed by sulfuric acid to produce a fertilizer such as ammonium sulfate. The treated gas 28 is discharged into the air atmosphere.

The anaerobic digestion step 10 is typically performed by the dual digestion process (using two digestion tanks) but it may also be carried out by any other known techniques such as the single digestion process and the UASB (upflow anaerobic sludge blanket) process. The anaerobic digestion step 10 is desirably performed by fermentation at a medium water temperature of 38°–40° C. but the biogases 11 can also be produced by high-temperature (55° C.) or low-temperature fermentation. For the period of treatment, 15–30 days may be given as a guide figure in the case of dual digestion. The digested sludge settling in the anaerobic digestion step 10 may be withdrawn as appropriate so that it is fed back to the thickening step 6 in a return path (not shown).

The emission gas 24 may be directed in a path (not shown) to be mixed with the biogases 11 for further use. Since the biogases usually have a heat value of 5,000–6,000 kcal/Nm$^3$, they are useful for the purpose of increasing the heat value of the emission gas 24.

The biodegradable organic materials (which may be soluble or insoluble) in the foul water are digested anaerobically to be gasified biologically and, thereafter, the undigested solids are gasified with the heat treatment apparatus; in this way, the organic materials in the foul water and the solids that are produced during the treatment process can be gasified almost completely. Thus, the combination of the biological treatment with the heat treatment allows different energy sources to be converted to a common gaseous form which can be utilized in an efficient and easy manner.

The dissolved ammonia will experience no changes under anaerobic conditions but it is fed into the ammonia separation step 12. Conventional typical methods of ammonia separation are ammonia stripping processes (e.g. steam stripping, air stripping and vacuum distillation) and ammonia is transferred into the vapor phase together with water vapor. Ammonia 13 in the vapor phase may be directly fed into the gas treatment step 27 but, alternatively, it may be condensed at low temperature together with water vapor so that it can be used as aqueous ammonia.

The concentration and amount of the ammonia to be injected into the gas treatment step 27 vary with the SOx and NOx concentrations of the emission gas to be treated, so the amount of ammonia injection is desirably adjusted automatically on the basis of detected SOx and NOx concentrations. If highly concentrated aqueous ammonia is necessary, the ammonia separation step may be carried out either with a conventional rectifying column that is furnished with a refluxing capability to be useful in the purification of solvents and the like or by means of a two- or three-stage concentrator which cyclically performs ammonia stripping and condensation.

While the foregoing description concerns the treatment of night soil-containing foul water 1, it should be noted that this may be conducted together with the treatment of sludges in small-scale sewage treatment facilities such as drainage treatment facilities in agricultural communities or other types of wastewater such as food processing wastewater and cattle or poultry raising wastewater. In this case, the sludges in small-scalae sewage treatment facilities or other types of wastewater are supplied as stream 30 in FIG. 1. The opposite case is of course possible, and the night soil-containing foul water may be supplied as stream 30 whereas food processing wastewater, cattle or poultry raising wastewater or the like is supplied as stream 1. Further, in addition to the dewatered cake 17, other organic wastes 31 such as domestic wastes (containing paper, plastics, garbage, etc.), solidified products thereof, dewatered cakes from other facilities, construction wastes such as woods, and scrap tires may also be supplied as feeds to the gasification furnace 19. If desired, valuable organic materials such as coal may be supplied in order to increase the yield of the gaseous mixture 21.

It is also within the scope of the invention to use nitrogen as a fertilizer since it is abundant in the night soil-containing foul water as shown in Table 1. Alternatively, ammonia can be effectively used as a desulfurizing or denitrifying agent. It should also be mentioned that the yet to be gasified stream 32 from the gasifying furnace 19, as well as the ash that is trapped by and discharged from the gasifying furnace 19 and the equipment in subsequent stages contains phosphorus and may be collected for use as a phosphorus fertilizer.

Steam recovery with a waste heat boiler is recommended as a method to be used in the energy recovery step 25 for recovering the energy of the emission gas 24 from the melting furnace 22. The recovered steam can be used for various purposes including use as a heating medium in the ammonia separation step 12, as the gasifying agent 20 and feeding to a dynamo (of a type that employs a steam turbine). If the gas passed through a waste heat boiler still holds a sufficient amount of energy (heat or inflammables), the following methods may be implemented in the energy recovery step 25:

(1) the gas from the waste heat boiler is freed of dust by means of a suitable device such as a ceramic filter and fed into a gas turbine to generate electricity, with steam being recovered by an ensuring waste heat boiler and the remainder discharged into the air atmosphere; the steam from the two waste heat boilers is supplied into a steam turbine for generating electricity; this method is suitable for high-pressure (20–40 atm) gases of low calorific value;

(2) the gas from the waste heat boiler is treated with a gas cleaner such as a scrubber and fed into a gas or diesel engine to generate electricity, with steam being recovered by an ensuring waste heat boiler and the remainder discharged into the air atmosphere; the steam from the two waste heat boilers is supplied into a steam turbine for generating electricity; this method is suitable for low- or medium-calorie gases that contain residual inflammables at atmospheric pressure.

Embodiment 2

In the flowsheet shown in FIG. 1, the separated water 8 may be treated by a nitrification-denitrification process with activated sludge and this second embodiment of the invention will now be described with reference to FIG. 2.

The separated water 8, together with a return sludge 40 and a circulating nitrified liquor 41, flows into a first denitrification tank 42 under anaerobic conditions and the nitric acid in the circulating nitrified liquor 41 is reductively decomposed (denitrified) into nitrogen gas by the denitrifying bacteria in the activated sludge. In the first denitrification tank 42, the BOD substance in the separated water 8 acts as a reducing agent for denitrification and if it is insufficient, an organic industrial chemical such as methanol 46 may be supplied externally to compensate for the insufficiency of the substance that can serve as a reducing agent. The activated sludge containing liquor leaving the first denitrification tank 42 then flows into a denitrifying tank 43 under aerobic conditions, where the ammonia in the liquor is oxidized to nitric acid by the nitrifying bacteria in the activated sludge and, thereafter, the greater part of the effluent is returned to the first denitrification tank 42, with the remainder being sent to a second denitrification tank 44 under anaerobic conditions, where the nitric acid is denitrified and the effluent is sent to a re-aeration tank 45 under aerobic conditions. In the nitrifying tank 43 under aerobic conditions, the reducing substance in the liquor is decomposed oxidatively and will not flow into the second denitrification tank 44; it is therefore necessary to add methanol 46 or other suitable denitrifying reducing agent to the second denitrifying tank 44. After the residual methanol is decomposed oxidatively in the re-aeration tank 45, the activated sludge containing liquor is fed into a settling tank 47, where it is separated into solid and liquid portions. The separated water 48 is introduced into the post-treatment step 14 shown in FIG. 1. The settling tank 47 is not the sole means of separating the activated sludge containing liquor into solid and liquid portions and any known separators may be employed such as a membrane separator and a centrifuge. Part of the separated activated sludge is returned as stream 40 to the first denitrification tank 42 and the remainder is transferred as an excess sludge 49 to the thickening step 6 in FIG. 1.

Figure 2:
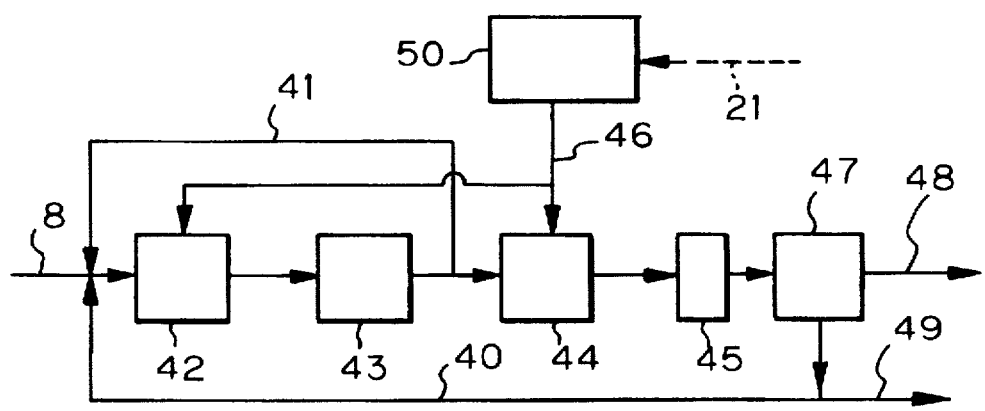
FIG. 2 is a flowsheet for foul water treatment in another embodiment of the invention.

In the flowsheet shown in FIG. 2, the methanol 46 is synthesized in a synthesis step 50 from the carbon monoxide and hydrogen in the gaseous mixture 21 and it has been found that the synthesized methanol is as effective as the heretofore used commercial methanol of an industrial grade, thereby contributing to a substantial cut on the cost of denitrification treatment.

In a nitrification-denitrification process of the scheme adopted in Embodiment 2, a large quantity of electricity is required to operate various motor-driven machines such as a blower to the nitrification tank 43 (for supplying the oxygen necessary to oxidize ammonia), a pump for supplying the separated water 8, a pump for circulating the nitrified liquor 41 and a pump for forcing the return sludge 40 and these machines can be driven with the electricity generated with the gas supplied from the gasification furnace 19.

Embodiment 3

Part of the return sludge 40 in the flowsheet of FIG. 2 may be branched through a bypass line and treated with ozone before it is combined with the remainder of the return sludge 40 for the treatment of the separated water 8. This third embodiment of the invention will now be described with reference to FIG. 3.

Figure 3:
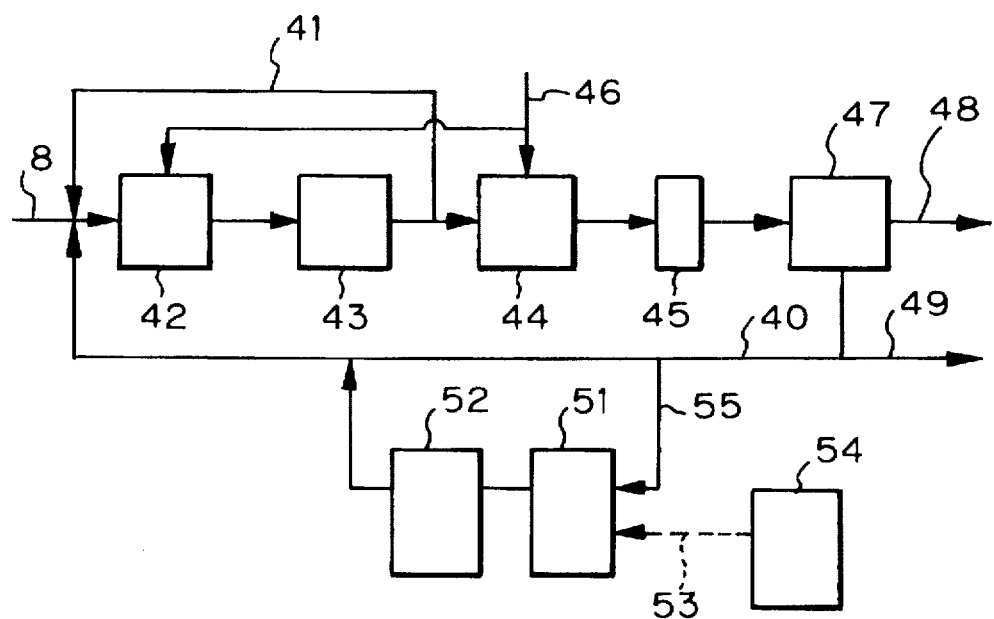
FIG. 3 is a flowsheet for foul water treatment in yet another embodiment of the invention.
Figure 4:
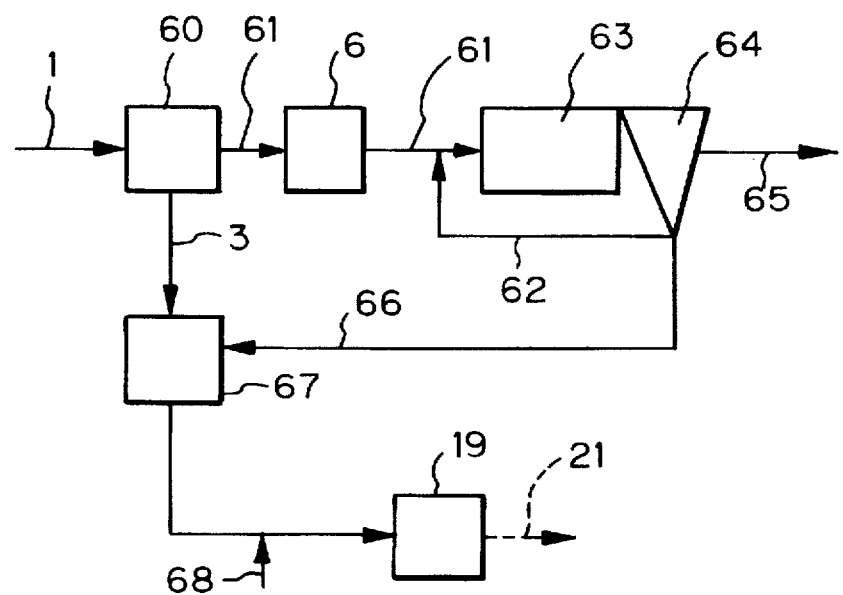
FIG. 4 is a flowsheet for foul water treatment in a further embodiment of the invention.

The flowsheet shown in FIG. 3 differs from what is shown in FIG. 2 in that part of the return sludge 40 is branched through a bypass line and fed into an ozone contact column 51 and that the methanol 46 to be added is a commercial rather than a synthesized product.

The system shown in FIG. 3 assumes the following operating conditions: flow-rate of separated water 8, 50 m³/day; quality of separated water 8, BOD=1,550 mg/L, $NH_3$—N=800 mg/L; temperature of water in nitrification tank 43, 23° C.; concentration of activated sludge, 2,550 mg/L; concentration of return sludge 40, 5,900 mg/L. About 20% of the return sludge 40 from the settling tank 47 is passed through the bypass line 55 to be fed into the ozone contact column 51, which is injected with 100 ppm of ozone 53 from an ozonizer. The sludge is retained in a relay tank 52 until there is no residual ozone and it is thereafter mixed with the remainder of the return sludge 40. As a result, the injection of methanol 46 could be reduced by about 10% and the generation of excess sludge 49 by about 15%. Since ozone 53 has a strong bactericidal action, care must be taken if an increased amount of the return sludge is branched through the bypass line 55 or if ozone 53 is directly added to the return sludge 40; to be specific, the first addition of ozone must be extremely small so that it will not cause any adverse effects on the activated sludge and the ozone concentration is gradually increased on the basis of constant monitoring of the operation profile.

Both the injection of methanol 26 and the generation of excess sludge 49 decreased for the following two probable reasons: due to the action of ozone 53, the extracellular polymer on the surfaces of the microorganisms in the activated sludge were decomposed into bioassimilable low-molecular weight substances and dissolved into water; secondly, the low-molecular weight substances worked effectively as a reducing agent in denitrification.

The electricity required by the ozonizer 54 was supplied from a dynamo utilizing the steam from the waste heat boiler applied to the energy heat recovery step 25 in the system shown in FIG. 1.

Embodiment 4

In another experiment, a stream of night soil-containing foul water 1 was treated by the conventional activated sludge process and the gasification furnace was supplied not only with the solids produced during the treatment of the night soil-containing foul water 1 but also with domestic wastes mainly composed of paper, plastics and garbage. Neither precipitant 4 nor 5 (see FIG. 1) was added to the night soil-containing foul water 1, which was filtered through a rotary screen 60 having openings of 1 mm. retained temporarily in the reservoir 9 and fed into an activated sludge aeration tank 63. An embodiment for performing this experiment is hereunder described with reference to FIG. 4.

The night soil-containing foul water 1 is passed through the rotary screen 60 to reject foreign matter 3. The separated water 61 is retained in the reservoir 6 temporarily before it is fed into the aeration tank 63 under aerobic conditions together with a return sludge 62. The influent is freed of the BOD component in the aeration tank 63 and fed into a settling tank 64, where the activated sludge is separated. Part of the separated sludge is fed back as return sludge 62 to the aeration tank 63 and the remainder is sent as excess sludge 66 to a dewatering step 67, where it is dewatered together with the rejected foreign matter 3. The dewatered sludge is thereafter supplied into the gasification furnace 19 together with domestic wastes 68.

The separated water 65 emerging from the settling tank 64 is free of the BOD component; however, neither nitrogen nor phosphorus can be removed by the activated sludge treatment and hence they are both contained in the separated water 65 at high levels. Therefore, the separated water 65 is desirably used as a liquid fertilizer rather than being discharged into a water course.

The gaseous mixture 21 from the gasification furnace 19 is burnt according to the flowsheet shown in FIG. 1 and all of the electricity required for the treatment of night soil-containing foul water 1 is supplied from a dynamo (using a gas engine) as applied to the energy recovery step 25.

In addition to the methods employed in the four embodiments described above, the night soil-based foul water 1 can be treated by various other reported methods and modifications thereof.

The present invention also encompasses the case where the night soil-containing foul water is subjected, directly and/or after a treatment, to a filtration step using a filter device packed with nonflammable particulate matter such as sand and the trapped solids are supplied to a fluidized-bed heat treatment apparatus, four different embodiments of this case will now be described with reference to FIGS. 5–8.

Embodiment 5

Figure 5:
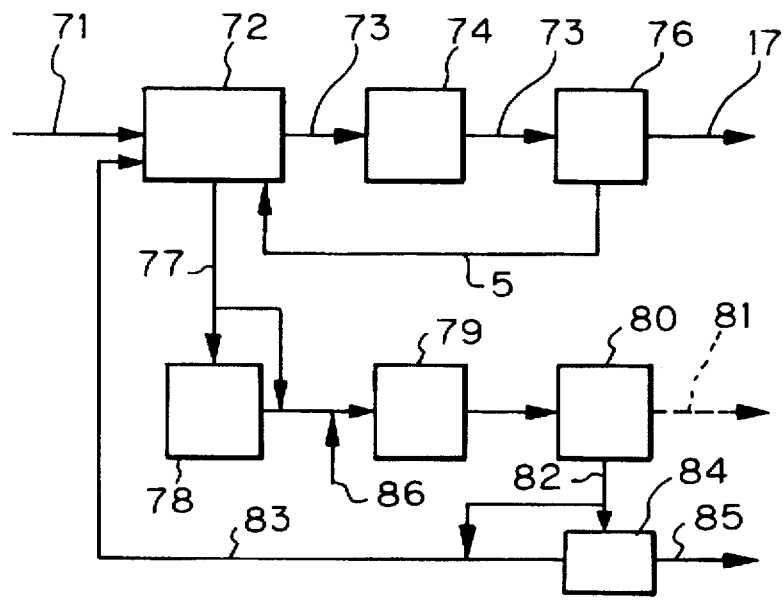
FIG. 5 is a flowsheet for foul water treatment in a still another embodiment of the invention.
Figure 6:
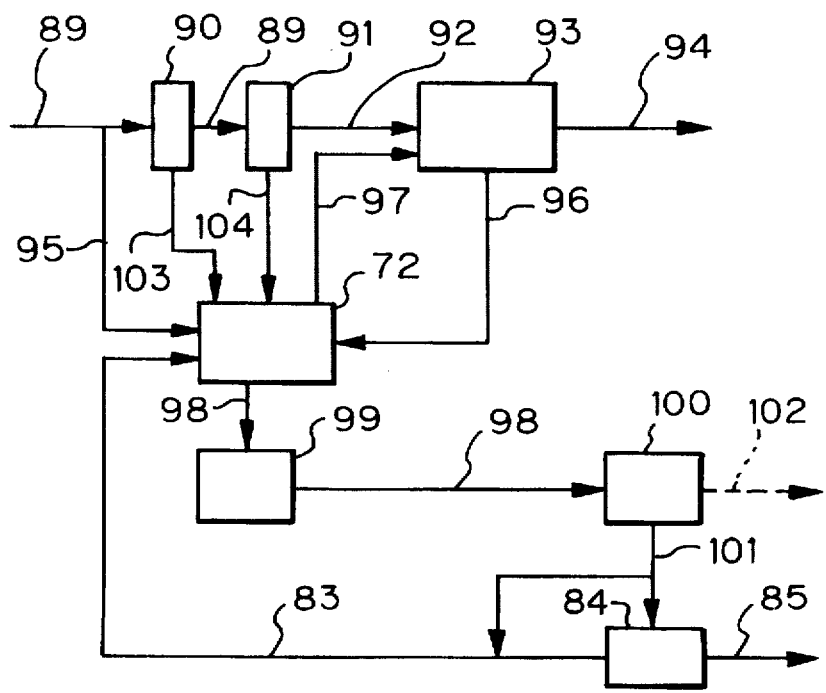
FIG. 6 is a flowsheet for foul water treatment in another embodiment of the invention.

A stream of night soil-containing foul water 1 is treated in accordance with the flowsheet shown in FIG. 5. A feed of night soil-containing foul water such as night soil or septic sludge is freed of solids by means of sand in a filtration step 72. The separated water 73 is retained temporarily in a reservoir 74 before it is sent into a separated water treatment step 76. The separated solids 77 are passed through a drying step 78 or directly retain ed in a hopper 79 before they are fed into a fluidized-bed gasification furnace 80, where they are gasified. The generated gas 81 is freed of dust and used either as an energy source by a dynamo (i.e., gas turbine, gas engine or diesel engine) or burnt with the steam being recovered by a waste heat boiler for use as an energy source in the production of steam to be used by a steam turbine in a dynamo. If the nonflammable 82 from the gasification furnace 80 contain solids 85 other than sand, they are separated by means of a separator 84 such as a gravity separator 84 or, alternatively, they may be directly used as additional sand 83 which is recycled to the filtration step 72.

The filter medium for use in the filtration step 72 may be nonflammable particulate matter such as sand particles having a size of 0.3–3.0 mm. The filtration rate required in the filtration step 72 is variable with operating parameters such as the temperature of the foul water (liquid sludge) to be treated, its viscosity, the concentration of solids, their state (flocculated or non-flocculated), the particle size of the filter medium and the pressure of the filter layer, so the filter area must be determined on the basis of preliminary onsite testing. Pressure filtration may be performed but if a spacious location is available for constructing the filtration facility, gravity filtration is recommended. In gravity filtration, a sun drying method may be employed.

If the filtration rate is extremely low, it can be enhanced by adding a precipitant such as a polymer (organic high-molecular weight precipitant) or slaked lime.

A scraper is a recommended means for displacing the separated solids 77.

The separated water treatment step 76 may be performed by known techniques conventionally applied to treat night soil-containing foul water, such as anaerobic digestion, ammonia stripping, the activated sludge process, biological nitrification-denitrification, flocculation, ozone treatment, membrane treatment and the activated carbon treatment; these techniques may be employed either singly or in combination.

The sludge 5 such as excess sludge or flocculated sludge that have been produced in the separated water treatment step 76 need be transferred into the filtration step 72 together with the night soil-containing foul water 71.

In addition to the septic sludge, sludges from other wastewater treatment facilities can also be treated together with the night soil-containing foul water 71 in accordance with the present invention and it is also possible to gasify the separated sludge from such other treatment facilities by means of the gasification furnace 80.

As already mentioned in connection with the prior art, a grit chamber is provided before each step of the treatment of night soil-containing foul water in order to prevent not only the reduction in the capacity of each reaction tank due to sand buildup but also the wear of the associated machine by sand. In the invention, the sand as a filter medium in the filtration step 72 can be replenished with the sand which is carried by the foul water into the system, so the grit chamber may be replaced by a tank in which pebblestone (or gravel) larger than sand is removed by sedimentation. Pebblestone settles by far more rapidly than sand, so the tank to be installed in place of the grit chamber may of an extremely small capacity. Even if sand accompanies the solids being scraped in the filtration step 72, it can be utilized as fluidized sand in the gasification furnace 80 and, hence, complete removal of the solids by scraping is assured. In addition, the fluidized sand that increases in amount due to sand replenishment is recyclable as sand to replenish the sand layer in the filtration step 72 and this sand is clean since any pollutants have been heat treated.

In addition to sand, zeolite, broken ceramics and any other known materials can be used as the nonflammable particulate matter in the filtration step 72.

As in a sun drying bed, the filtration step 72 may employ a sand layer in a thickness of 20–30 cm and an underlying gravel layer in a thickness of the same range, with water collecting pipes such as perforated pipes being preferably installed under the gravel layer. The water content of the solids is determined by the allowance for the heat value of the gasification furnace (heat treatment equipment) and if there is a sufficient allowance, the solids may have a high water content.

If the biogases 11 are burnt with a vortex-type melting furnace (not shown) and if the gases passed through a waste heat boiler still hold a sufficient amount of energy (heat or inflammables), the following methods may be employed to recover the energy:

(1) the gas from the waste heat boiler is freed of dust by means of a suitable device such as a ceramic filter and fed into a gas turbine to generate electricity, with steam being recovered by an ensuing waste heat boiler and the remainder discharged into the air atmosphere; the steam from the two waste heat boilers is supplied into a steam turbine for generating electricity; this method is suitable for high-pressure (20–40 atm) gases of low calorific value;

(2) the gas from the waste heat boiler is treated with a gas cleaner such as a scrubber and fed into a gas or diesel engine to generate electricity, with steam being recovered by an ensuing waste heat boiler and the remainder discharged into the air atmosphere; the steam from the two waste heat boilers is supplied into a steam turbine for generating electricity; this method is suitable for low- or medium-calorie gases that contain residual inflammables at atmospheric pressure.

The electricity produced with the gas 81 from the gasification furnace 80 is useful as power to the night soil treatment plant.

Besides the separated solids 77, organic wastes 86 such as organic industrial wastes and domestic wastes primarily composed of paper, plastics and garbage may also be supplied to the gasification furnace 80 and this contributes not only to compensate for the power consumption by the night soil treatment plant but also to supply power to external facilities.

Embodiment 6

The method of the invention is also applicable to the treatment of sewage having lower concentrations of contaminants (e.g. suspended solids and BOD) than the night soil-containing foul water. This embodiment will now be described below with reference to FIG. 6.

A sewage feed 89 is first retained in a grit chamber 90, then introduced into a primary sedimentation tank 91, whereby solids such as sand 103 and organic suspended matter 104 are successively removed; the separated water 92 is fed into a sewage treatment step 93 employing the activated-sludge method and the treated water 94 is discharged into a water course. Besides the standard activated-sludge method, other known treatment methods such as the nitrification-denitrification process and the biological phosphorus removal process may be employed in the sewage treatment step 93.

As already mentioned, sewage water has comparatively low solids concentrations and is fed in fairly large quantities, so in contrast with the night soil-containing foul water or liquid sludge which can be introduced directly into the filtration step 72, the sewage is preferably first fed into the grit chamber 90 and the primary sedimentation tank 91 so that it is separated into solid and liquid portions before entrance into the filtration step 72. However, if the solids loading of the filtration step 72 is small enough, the sewage feed 89 may be branched through a bypass line 95 to be introduced direct into the filtration step 72.

The sludge 96 produced in the sewage treatment step 93 is sent to the filtration step 72. The separated water 97 from the filtration step 72 is transferred to the sewage treatment step 93 for further treatment. The separated solids 98 from the filtration step 72 are fed into a hopper 99, from which they are introduced intro a fluidized-bed incinerator 100 for combustion; the resulting ash 101 is transferred via line 83 to the filtration step 72 either directly or after separation non-sand solids 85 in a separator 84.

If the sand collected from the grit chamber 90 is accompanied by gravel, a screen may optionally be used to separate the sand from the gravel such that the sand alone can be introduced into the filtration step 72.

In the fluidized-bed incinerator 100, the sand packed in as a heating medium is fluidized with the air supplied from the bottom of the furnace, so the separated solids 98 will mix with the sand and can be burnt within an extremely short period of time. In order to achieve uniform mixing, the separated solids 98 are preferably ground into smaller sizes with a comminutor before they are charged into the fluidized-bed incinerator 100.

The emission gas 102 from the incinerator 100 may be fed into a waste heat boiler, where heat is recovered as steam and supplied into a steam turbine in a dynamo to generate electricity that serves as an additional supply of power to the plant, thereby accomplishing an economical treatment of the sewage.

Embodiment 7

Figure 7:
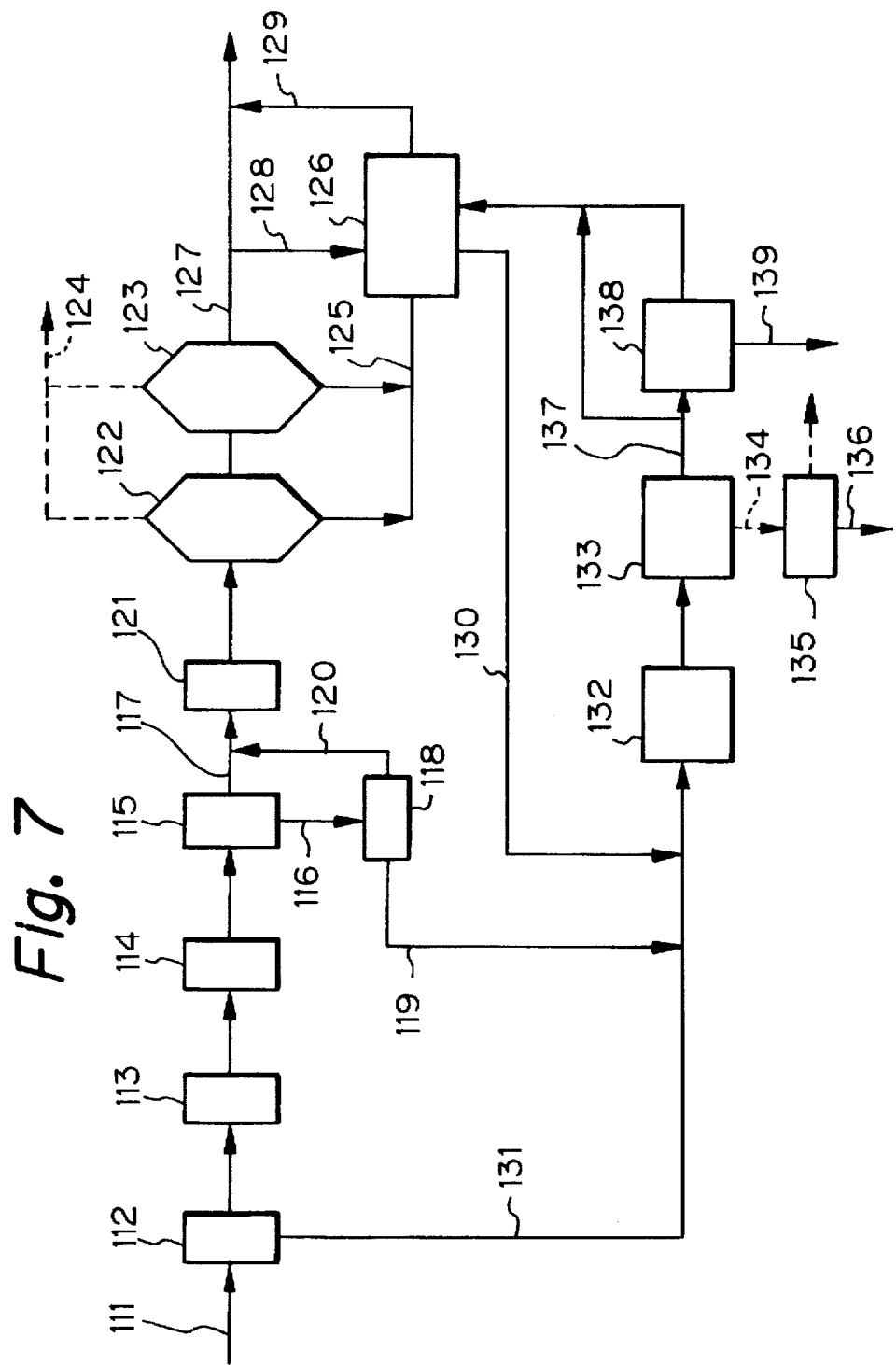
FIG. 7 is a flowsheet for foul water treatment in yet another embodiment of the invention.

We now describe another embodiment of the invention according to the flowsheet shown in FIG. 7. A feed of night soil-containing foul water 111 such as night soil or septic sludge is detained in a grit chamber 112 to remove sand and gravel. The effluent is held temporarily in a receiving tank 113 before it is forced through a pretreatment screen 115 (screen opening: 1–3 mm) by means of a comminuting pump 114, whereby the effluent is separated into a solid portion (screenings) 116 and a liquid portion (separated water) 117. The screenings 116 are sent to a screenings dewatering apparatus 118, from which dewatered screenings will emerge. The dewatered filtrate 120 combines with the separated water 117, which is retained in a reservoir 121 for a sufficient time to adjust variations in the liquid level before it is introduced into a first digestion tank 122 with agitation under anaerobic conditions, then into a second digestion tank 123 without agitation under anaerobic conditions. Agitation may be accomplished with a gas or by mechanical means. The gas agitation uses the gas in the vapor phase which is forced into the bottom of the tank via a blower, whereas the mechanical agitation employs rotating blades to agitate the liquor in the tank. The gas agitation provides more intense agitation than the mechanical version but, on the other hand, it consumes more electricity.

In the digestion tanks 122 and 123, easily degradable organic acids are rapidly decomposed into biogases (methane and carbon dioxide) 124; on the other hand, suspended solids are converted to low-molecular weight substances over a comparatively prolonged time and, eventually, they are also decomposed into biogases 124. The suspended solids are high-molecular weight substances and many of them are comparatively low in biodegradability, so only a limited portion of the suspended solids can be decomposed into biogases. Biogases 124 are also evolved in the second digestion tank 123 but, due to the absence of agitation, the solids will settle and must be discharged into a filtration step 126 as part of a digested sludge 125. In the first digestion tank 122 where agitation is effected, sand and other solids having high specific gravity will build up over time and it is desired to discharge the deposits periodically. The supernatant liquor 127 from the second digester 123 contains residual nitrogen and phosphorus and, hence, can be used as a liquid fertilizer. If the supernatant liquor 127 is to be discharged into a water course, the nitrogen and phosphorus contents are preferably removed in order to prevent eutrophication of the receiving water. In order to remove the residual suspended solids from the supernatant liquor 127, part or all of the latter may be directed into the filtration step 126 through a bypass line 128. The filtrate 129 is combined with the supernatant liquor 127 and either discharged into a water course or used as a liquid fertilizer.

The trapped sludge 130 exiting from the filtration step 126 is combined with the dewatered screenings 119 and the settled sand 131 from the grit chamber 112 and charged into a hopper 132, from which they are fed into a fluidized-bed incinerator 133 for combustion. The ash 136 in the combustion gas 134 from the incinerator 133 is removed by means of a dust removing apparatus 135 such as an electric precipitator or a bag filter. Although not shown, a waste heat boiler may be installed to recover steam so that the heat of the emission gas 134 can be utilized and this is an effective means for recovering energy. If desired, a heat recovery pipe may be inserted into the fluidized-bed incinerator 133 such that steam can be recovered as energy.

The sand separated during the process of treatment of the night soil-containing foul water 111, as well as the sand which accompanies the trapped sludge 130 as it is scraped in the filtration step 126 will both increase the amount of the sand in the fluidized layer in the incinerator 133, so part of the fluidized sand 137 may be recycled as a sand replenisher to the filtration step 126 either directly or after the foreign material 139 in the fluidized sand is separated by means of a suitable separating apparatus 138 such as a screen or a gravity separator. The recycled sand is clean since any pollutants have been heat treated.

The deposit 131 in the grit chamber 112 contains not only sand but also gravel having a particle size of about 10 mm, so the latter is desirably removed by a screen or other suitable means before the deposit is charged into the fluidized-bed incinerator 133. The deposit 131 may be transferred to the filtration step 126 so that it can be used as filtering sand. If the screenings 116 are transferred to the filtration step 126, they need not be dewatered and, hence, the dewatering apparatus 118 can be omitted.

The night soil-containing foul water may be transferred from the comminuting pump 114 direct into the first digestion tank 122 without passing through the screen 115 and the reservoir 121. In this case, the foul water flowing into the first digester 122 has such high solids concentrations that it is not only necessary to ensure thorough mixing in the first digester 122 by increasing the intensity of agitation but at the same time care must be taken to avoid influence of volumetric loading variations.

The water temperature is preferably held at about 38° C. to perform medium-temperature fermentation in the first digestion tank 122 so that the organic materials can be gasified in a consistent manner. A convenient method of heating is such that the steam produced by the heat generated in the fluidized-bed incinerator 133 is injected directly into the first digestion tank 122. The effective capacity of each digestion tank may be so adjusted that the residence time of the separated water 117 is approximately 15 days.

The biogases 124, after optional desulfurization with an iron-based desulfurizer, may be stored temporarily in a gas tank, then used as an ancillary fuel to the fluidized-bed incinerator 133 or as a fuel to other combustors.

The filter medium to be used in the filtration step 126 may be selected from among known types of nonflammable particulate matter including sand (0.3–3.0 mm in particle size), broken ceramics, fused slag of ash and zeolite. The filtration rate required in the filtration step 126 is variable with operating parameters such as the temperature of foul water (liquid sludge) to be treated, its viscosity, the concentration of solids, their state (flocculated or non-flocculated), the particle size of the filter medium and the pressure of the filter layer, so the filter area must be determined on the basis of preliminary onsite testing. Pressure filtration may be performed but if a spacious location is available for constructing the filtration facility, gravity filtration is recommended. If a sun drying method is employed in gravity filtration, efficient dewatering can be accomplished by the combined action of filtration and evaporation and, hence, use of sunlight in combination with gravity filtration is recommended in hot climates. An effective sun drying apparatus may be constructed by reference to known examples.

As in a sun drying bed, the filtration step 112 may employ a sand layer in a thickness of 20–30 cm and an underlying gravel layer in a thickness of the same range, with water collecting pipes such as perforated pipes being preferably installed under the gravel layer. The water content of the solids is determined by the allowance for the heat value of the gasification furnace (heat treatment equipment) and if there is a sufficient allowance, the solids may have a high water content.

The filtration rate can be improved by adding a precipitant such as a polymer (organic high-molecular weight precipitant) or slaked lime.

In a preferred case (not shown), the supernatant liquor 127 may be subjected to an aeration treatment or an aerobic biological treatment and the treated liquor per se or the sludge separated from the liquor is supplied to the filtration step 126. As the result of the aerobic (oxidative) treatment, the fine residual solids in the supernatant liquor 127 will agglomerate to form a coarse floc that permits easy filtration.

A scraper is a recommended means for displacing the separated solids 112.

Embodiment 8

Night soil-containing foul water can be treated by a simpler scheme than what is shown in FIG. 7 and this embodiment which has the additional feature of gasifying unfiltered solids in a gasification furnace will now be described with reference to FIG. 8.

Figure 8:
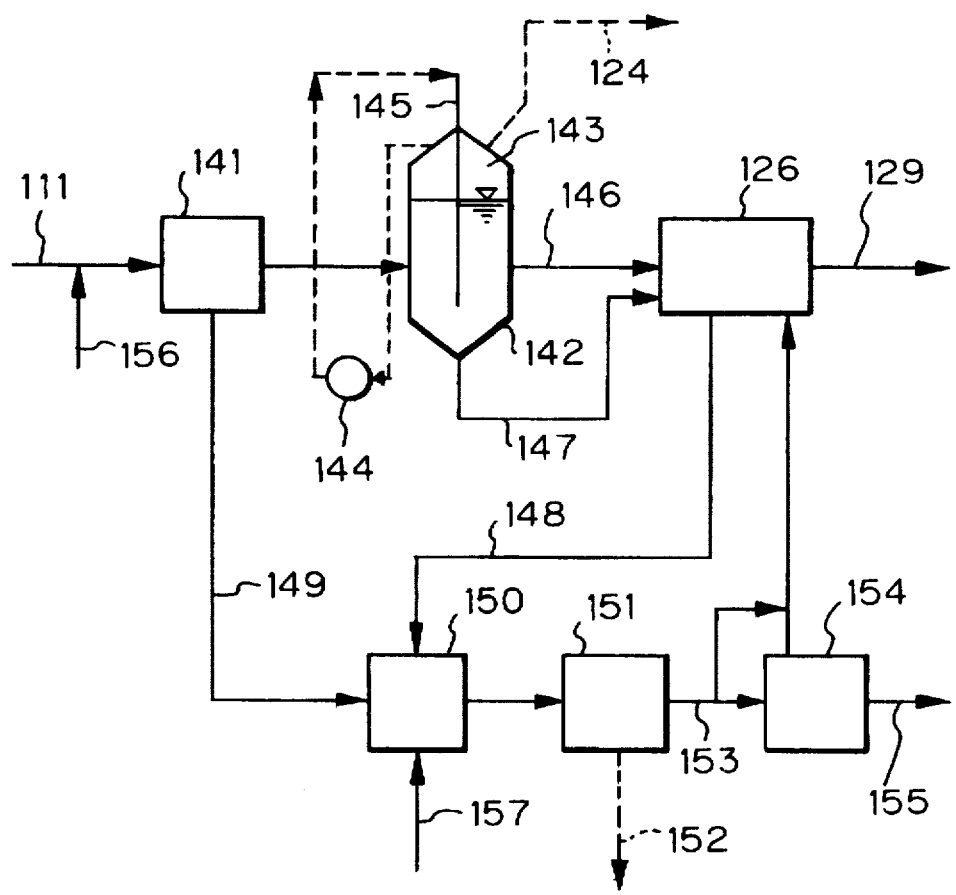
FIG. 8 is a flowsheet for foul water treatment in a further embodiment of the invention.

As shown in FIG. 8, a feed of night soil-containing foul water 111 is passed through a screen 141 to reject large-size solids and then charged into an anaerobic digestion tank 142. The screen opening is suitably in the range of 1–10 mm for a rotary screen and 5–20 mm for a bar screen. To separate gravel and waste sanitary goods, a screen opening of about 3–7.8 mm may be given as a guide figure. Compared with the embodiment illustrated in FIG. 7, the quantities of relatively small gravel, sand and organic suspended solids that will flow into the anaerobic digester 142 are increased, and, hence, gas agitation which provides intense stirring is preferably performed in the digestion tank 142.

To effect gas agitation, the gas in the vapor phase 143 of the tank 142 is aspirated with a blower 144 and forced through a pipe 145 to get close to the bottom of the tank 142, thereby stirring its contents satisfactorily. Since the digester 142 is a single tank, its effective capacity may be designed to allow the night soil-containing foul water 111 to be detained for at least 20 days to take the safe side. The effluent 146 from the digestion tank has the solids suspended due to the agitating action and, hence, it is totally supplied to a filtration step 126 for filtration purposes. In the embodiment under consideration, no grit chamber is installed and, hence, more sand will be deposited in the digestion tank 142 than in Embodiment 7, requiring more frequent withdrawal of the settled sand 147 than in Embodiment 7. If desired, the effluent 146 from the digestion tank 142 may be aerated in an aeration tank (not shown) for several days, thereby improving the filtration characteristics of the effluent 146 as in Embodiment 7.

The trapped sludge 148 exiting from the filtration step 126 is combined with the screenings 149 and charged into a hopper 150, from which they are fed into a fluidized-bed gasification furnace 151 to produce gases. The amount of the fluidized sand in the gasification furnace 151 is increased by the sand which accompanies the incoming night soil-containing foul water 111, as well as by the sand which accompanies the trapped sludge 148 as it is scraped in the filtration step 126; hence, part of the fluidized sand 153 may be recycled as a sand replenisher to the filtration step 126 either directly or after the foreign material 155 in the fluidized sand is separated by means of a suitable separating apparatus such as a screen or a gravity separator.

The generated gas 152 is freed of dust and used either as an energy source by a dynamo (i.e., gas turbine, gas engine or diesel engine) or burnt with the steam being recovered by a waste heat boiler for use by a steam turbine in a dynamo.

If the gas 152 is partially burnt with a vortex-type melting furnace (not shown) and if the gas passed through a waste heat boiler (for generating steam) still holds a fuel gas, it may be treated by the same method as the gas 81 described with reference to FIG. 5 to thereby recover energy.

The electricity produced with the gas 152 from the gasification furnace 151 is useful as power to the night soil treatment plant.

According to the present invention, organic foul water such as food processing wastewater and the separated sludge from other treatment facilities can be treated together with the night soil-containing foul water 111. In addition, the hopper 150 may also be charged with organic wastes 157 such as organic industrial wastes, domestic wastes primarily composed of paper, plastics and garbage and dewatered sludge, which are supplied into the gasification furnace 150 and this contributes not only to compensate for the power consumption by the night soil-containing treatment plant but also to supply power to external facilities.

Biogases 124 evolving from the digestion tank 142 may be combined with the gas from the gasification furnace 152 and used as a source of energy.

Example

An experiment was conducted in accordance with the flowsheet shown in FIG. 7, except that the fluidized-bed incinerator was replaced by the combination of a fluidized-bed gasification furnace and a gasification melting furnace. A feed of night soil (100 m$^3$/day) was detained in a grit chamber to remove sand and gravel. The effluent was held temporarily in a receiving tank before it was forced through a pretreatment screen with openings of 1–3 mm by means of a comminuting pump, whereby the effluent was separated into a solid portion (screenings) and a liquid portion (separated water). The screenings were sent to a screenings dewatering apparatus, from which dewatered screenings emerged. The dewatered filtrate was combined with the separated water, retained in a reservoir before it was introduced into a first digestion tank (1,500 m$^3$) under agitation at 37°–38° C., then into a second digestion tank (1,500 m³) at 37°–38° C. in the absence of agitation. In the first and second digestion tanks, organic acids and part of the suspended solids were decomposed into biogases (primarily consisting of methane and carbon dioxide), which were evolved in a volume of 985 m³/day and the digested sludge (concentration, 23 kg/m³; flow rate, 12 m³/day) was discharged into a sand filtration tank.

The sand filtration tank had an effective area of 300 m² and contained a 30-cm thick sand layer and an underlying gravel layer of the same thickness, with the sand particle size being 0.4–1.0 mm. The filtration (dewatering) time was 5 days and the dewatered sludge had an average water content of 82 wt %. The trapped sludge (2.2 t) was combined with the sand removed by detention in the grit chamber, 1.2 t dewatered screenings (water content: 58% by weight), 2.0 t of scrap tires and 2.0 t of domestic organic wastes (primarily composed of paper, plastics and garbage) and the mixture was burnt in a fluidized-bed gasification furnace (see FIG. 1).

The fluidized-bed gasification furnace had the following specifications: sand, 1.3 m³ (2.0 t); sand layer thickness (static layer height), 0.6m; sand particle size, 0.4–1.0 mm; gasification temperature, 500°–600° C. in the fluidized layer, and 700°–800° C. in the freeboard); air ratio, 0.15; internal pressure, −20 mmAq; air flow rate, 147 Nm³/h; gas evolution, 265 Nm³/h; gas heat value, 2,500 kcal/Nm³.

After the dewatered sludge was gasified in the fluidized-bed gasification furnace, the sand in the fluidized layer was fed into a separator to separate sand particles of 0.4–1.0 mm in size, which were recycled to the sand filtration tank.

The gaseous mixture evolved in the fluidized-bed gasification furnace which contained hydrogen, carbon monoxide, water vapor, tar and carbides was introduced into a gasification melting furnace, where it was subjected to rapid oxidation with air supplied at 1,130 Nm³/h in an air ratio of 1.15 at a temperature as high as about 1,350° C., thereby evolving a hot (wet) gas at a flow rate of 1,480 Nm³/h; the ash in the gaseous mixture was melted at the high temperature and discharged as slag; at the same time, tar which would be detrimental to effective utilization of the evolved gas was burnt away.

The present invention offers the following advantages.

(1) Solids (sludge) resulting from the process of foul water treatment have heretofore been considered to defy utilization of their energy; however, according to the invention, such solids are gasified to permit economical and easy generation of electricity, thereby enabling captive production of electricity which is an indispensable form of energy to the treatment of foul water.

(2) Incineration and gasification treatments using fluidized beds ensure that the sand which accompanies the inflow of foul water and which has heretofore been considered a nuisance can be reclaimed and recycled for use as both fluidized sand and a filter medium.

(3) The incoming sand is a nonflammable waste and must conventionally be disposed of as a landfilling material; according to the invention, it can be supplied as a captive material to fill the fluidized-bed gasification furnace and incinerator and this also enables effective utilization of the nonflammable sand, thereby extending the useful life of currently available landfill sites.

(4) No troubles will occur if sand accompanies the sludge being scraped from the sand filter bed and, hence, complete sludge scraping can be accomplished in an easy and yet efficient manner.

(5) The step of grit removal in the process of foul water treatment can be considerably shortened; in addition, settled grit can be handled conveniently enough to reduce the cumbersomeness and dirtiness of grit removing procedures.

(6) When the solids in foul water are treated together with domestic and industrial wastes by means of a fluidized-bed incinerator or gasification furnace, the sand accompanying the feed foul water is sent to these furnaces in the form it is contained in the sludge produced in the process of foul water treatment and hence can be suitably used as fluidized sand.

(7) The reducing agent required to perform a biological nitrification-denitrification process can be synthesized and supplied from the gas produced in the gasification furnace at a foul water treatment facility and this contributes to economical implementation of the nitrification-denitrification process.

(8) Both the solids produced from the overall process at the foul water treatment facility and externally supplied organic wastes can simultaneously and easily be converted to energy (gasified) and utilized in power generation and, hence, improvements in various aspects of foul water treatment, including the treatment of gases utilizing ammonia striping in order to prevent eutrophication, conversion to fertilizers and the reduction in excess sludge production due to the ozone generated by electricity, can be accomplished economically utilizing the energy produced by gasification.

(9) By combining a biological gasification (anaerobic digestion) process with the combustion to form gases, the solids that are produced during the treatment of foul water are gasified almost completely and different energy sources can be converted to a common gaseous form, which can be utilized in an efficient and easy manner.

What is claimed is:

1. A method of treating foul water comprising at least one of night soil, septic sludge and sewage, which comprises:
   (a) feeding the foul water into a first chamber, where it is detained to remove sand and gravel;
   (b) holding effluent from said first chamber temporarily in a receiving tank and forcing it through a pretreatment screen, whereby the effluent is separated into a solid portion and a liquid portion;
   (c) sending the solid portion to a dewatering apparatus, from which dewatered screenings emerge;
   (d) introducing separated water into an anaerobic digestion treatment apparatus, or biological denitrification treatment apparatus, or activated sludge treatment apparatus, whereby treatment is conducted to produce digested sludge or excess sludge;
   (e) introducing the digested sludge or excess sludge into a sand filtration tank having a sand layer and an underlying gravel layer;
   (f) combining sludge trapped with sand of said sand layer, sand removed by detention in the first chamber, dewatered screenings from a screenings dewatering apparatus, waste materials comprising scrap tires and domestic organic wastes to form a mixture, fluidizing the mixture to form a fluidized layer, and burning the mixture in a fluidized-bed heat treatment apparatus;
   (g) after burning the sludge in the fluidized-bed heat treatment apparatus, feeding sand from the fluidized layer into a separator to separate said sand, and recycling the resultant separated sand to said sand filtration tank.

2. A method according to claim 1, wherein the anaerobic digestion apparatus comprises a first digestion tank under agitation and a second digestions tank in the absence of agitation, wherein said separated water is first introduced into said first digestion tank and then into said second digestion tank.

3. A method according to claim 1, wherein a gaseous mixture evolved in the fluidized-bed gasification furnace which contains hydrogen, carbon monoxide, water vapor, tar and carbides is introduced into a gasification melting furnace, where it is subjected to rapid oxidation with air, thereby evolving a hot gas and ash in the gaseous mixture said ash is melted and discharged as slag.

4. A method according to claim 3, wherein ammonia is separated in the process of foul water treatment and utilized in the denitrification and desulfurization of the emission gas from said heat treatment apparatus and in the production of a nitrogen fertilizer.

5. A method according to claim 1, wherein the gas produced by gasification or combined gasification and combustion in said heat treatment apparatus is converted to a reducing agent such as methanol and used in biological denitrification of the foul water.

6. A method according to claim 2, wherein the energy produced in said heat treatment apparatus is supplied into an ozonizer and the ozone produced is used in the process of treatment of said foul water to control the production of excess sludge in a biological treatment step.

7. A method according to claim 1, wherein said fluidized-bed heat treatment apparatus is a fluidized-bed incinerator or a gasification furnace, and wherein the mixture is fed to said fluidized-bed incinerator or said gasification furnace where said burning is carried out.

8. A method of treating foul water comprising at least one of night soil, septic sludge and sewage, which comprises:

removing solids from the foul water to provide a solid portion and separated water;

introducing said separated water into an anaerobic digestion treatment apparatus, or biological denitrification treatment apparatus, or activated sludge treatment apparatus, whereby treatment is conducted to produce digested sludge or excess sludge;

introducing the digested sludge or excess sludge into a sand filtration tank having a sand layer and an underlying gravel layer;

combining sludge trapped with sand of said sand layer, said solid portion, and waste materials comprising scrap tires and domestic organic wastes to form a mixture, fluidizing the mixture to form a fluidized layer, and burning the mixture in a fluidized-bed heat treatment apparatus;

after burning the sludge in the fluidized-bed heat treatment apparatus, feeding sand from the fluidized layer into a separator to separate said sand, and recycling the resultant separated sand to said sand filtration tank.

9. A method according to claim 8, wherein the anaerobic digestion apparatus comprises a first digestion tank under agitation and a second digestions tank in the absence of agitation, wherein said separated water is first introduced into said first digestion tank and then into said second digestion tank.

10. A method according to claim 8 wherein a gaseous mixture evolved in the fluidized-bed gasification furnace which contains hydrogen, carbon monoxide, water vapor, tar and carbides is introduced into a gasification melting furnace, where it is subjected to rapid oxidation with air, thereby evolving a hot gas and ash in the gaseous mixture said ash is melted and discharged as slag.

11. A method according to claim 10, wherein ammonia is separated in the process of foul water treatment and utilized in the denitrification and desulfurization of the emission gas from said heat treatment apparatus and in the production of a nitrogen fertilizer.

12. A method according to claim 8, wherein the gas produced by gasification or combined gasification and combustion in said heat treatment apparatus is converted to a reducing agent such as methanol and used in biological denitrification of the foul water.

13. A method according to claim 9, wherein the energy produced in said heat treatment apparatus is supplied into an ozonizer and the ozone produced is used in the process of treatment of said foul water to control the production of excess sludge in a biological treatment step.

14. A method according to claim 8, wherein said fluidized-bed heat treatment apparatus is a fluidized-bed incinerator or a gasification furnace, and wherein the mixture is fed to said fluidized-bed incinerator or said gasification furnace where said burning is carried out.

* * * * *